No. 814,358. PATENTED MAR. 6, 1906.
J. J. COX.
PLASTIC BLOCK MOLDING MACHINE.
APPLICATION FILED MAR. 3, 1905.
2 SHEETS—SHEET 2.
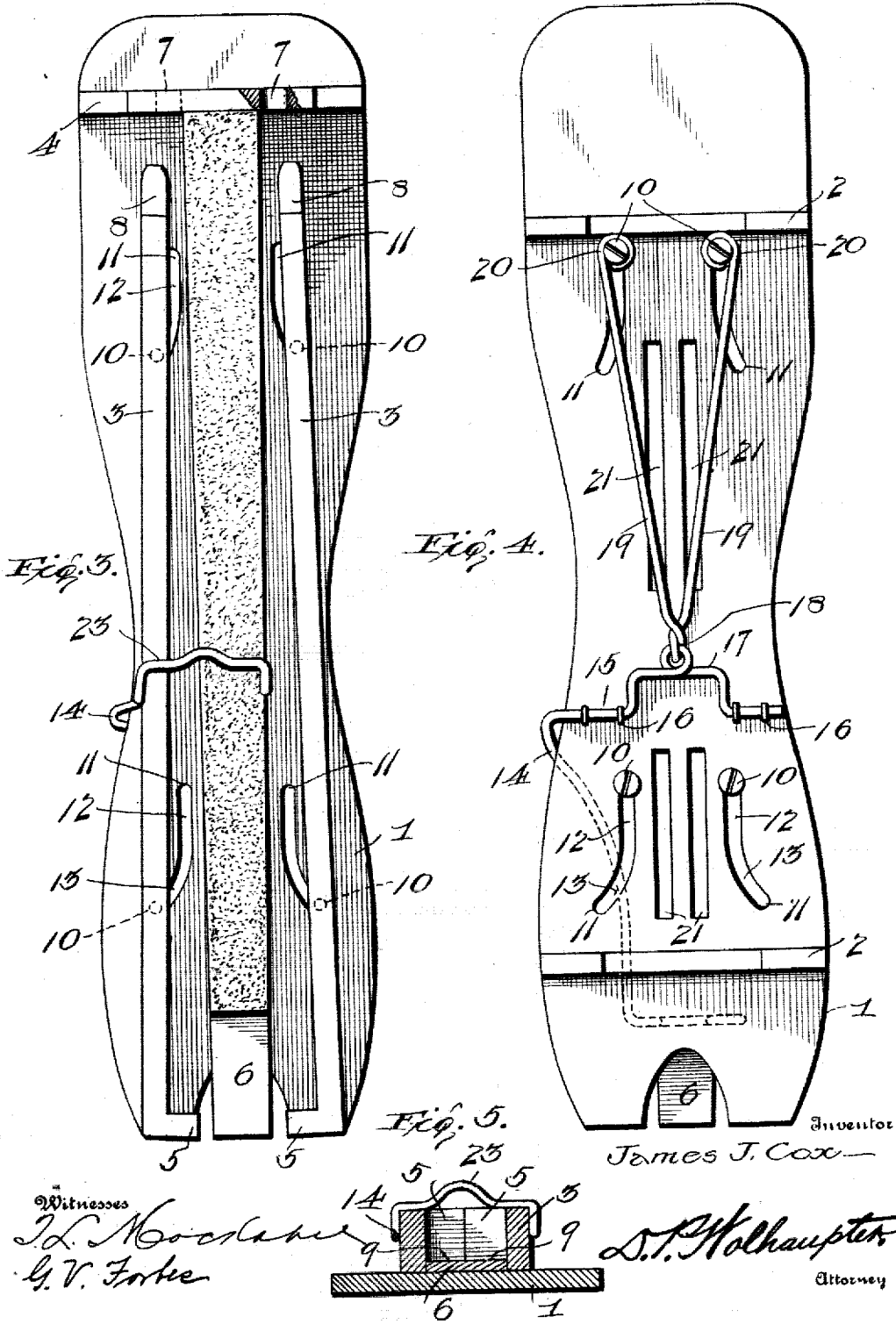
Witnesses
Inventor
James J. Cox
Attorney

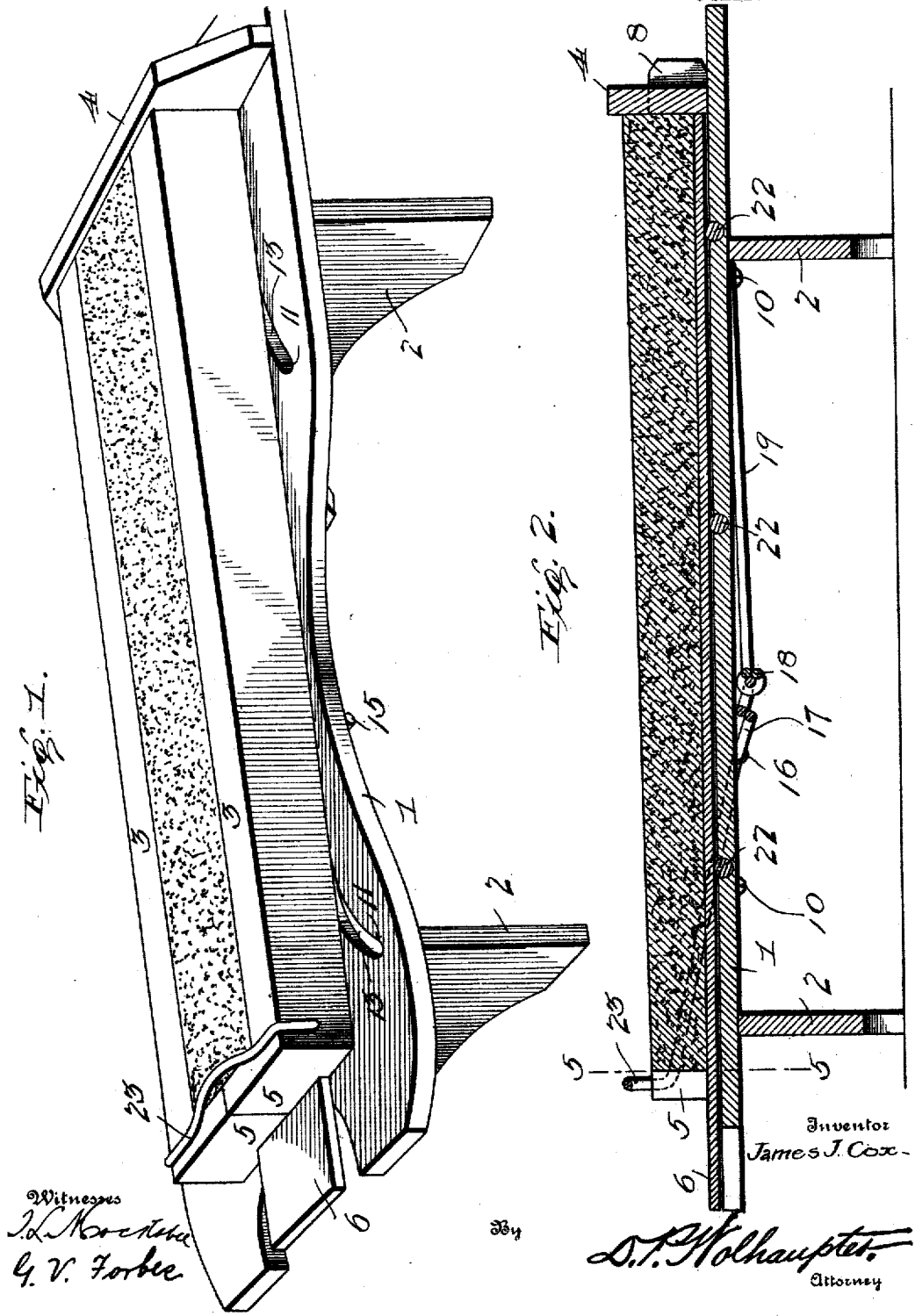

UNITED STATES PATENT OFFICE.

JAMES J. COX, OF JACKSON, MICHIGAN.

PLASTIC-BLOCK-MOLDING MACHINE.

No. 814,358.        Specification of Letters Patent.        Patented March 6, 1906.

Application filed March 3, 1905. Serial No. 248,316.

*To all whom it may concern:*

Be it known that I, JAMES J. COX, a citizen of the United States of America, residing at Jackson, in the county of Jackson and State of Michigan, have invented certain new and useful Improvements in Plastic-Block-Molding Machines, of which the following is a specification.

This invention relates to an improved plastic-block-molding machine designed for the molding of building or structural blocks, fence-posts, structural columns, and such other articles as are molded from cement, concrete, or equivalent plastic composition of matter. The term "block" as applied to this machine is therefore intended to comprehend articles designed for any use that may be molded therein from cement or other composition.

Many of the common types of block or post molding machines in ordinary use involve the employment of mold-walls which are mounted on hinges or otherwise arranged to fold toward and from the article being molded; but in this type of molds oftentimes the blocks or posts are imperfectly formed, and, furthermore, when the sides of the mold are pulled away from the molded article the latter is left with a rough finish and often broken at the corners. These defects are usually overcome by pointing up the article and sometimes by separately troweling the same after the mold-walls are taken away from the mold-body.

It is the purpose of the present invention to overcome these objections to the type of molding-machine referred to by providing a simple and practical construction wherein the mold itself is provided with means whereby a troweling or smoothing effect may be accomplished before the molded article is removed from the mold. In this connection the invention provides not only means for troweling or smoothing up the sides of the article lying against the mold sides, but also quickly and readily opening up and closing the mold to facilitate the handling of the material and the finished article.

A further object of the invention is to provide novel means for handling the side walls of the mold while the latter remain in an upright position, whereby said walls may be readily opened up and closed together, while at the same time, through a portion of their movement, providing for the troweling or smoothing action referred to.

With these and many other objects in view, which will more fully appear as the nature of the invention is better understood, the same consists in the novel construction, combination, and arrangement of parts, which will be hereinafter more fully described, illustrated, and claimed.

The essential features of the invention involved in the endwise-movable mold sides or side walls and the means for simultaneously operating the same for troweling the sides of the molded article and for spreading open the mold are necessarily susceptible to structural modifications without departing from the scope of the invention; but a preferred embodiment of the present invention is shown in the accompanying drawings, in which—

Figure 1 is a perspective view of a complete block-molding machine embodying the present invention and showing the mold closed and locked and also illustrating a cement or plastic body filled into the same to form a post or column. Fig. 2 is a central longitudinal sectional view of the mold in the form shown in Fig. 1. Fig. 3 is a top plan view of the mold, showing the sides or side walls spread open and away from the molded article with the latter in position for being removed upon the bottom member of the mold. Fig. 4 is a bottom plan view of the molding-machine. Fig. 5 is a detail cross-sectional view on the line 5 5 of Fig. 2, showing the yoke-handle of the operating-lever engaged across one end of the mold to serve as a mold clamp or lock for that end.

Like reference-numerals designate corresponding parts in the several figures of the drawings.

In carrying out the invention the parts of the mold proper are arranged upon a fixed flat base 1 of any suitable dimensions, according to the character of the block or post which the machine is designed to have molded therein. In the preferred form of the invention shown in the drawings the fixed flat base 1 is illustrated as being of an approximate rectangular form corresponding to the general form of a post and is provided with suitable supporting-legs or rests 2 for supporting the same in a sufficiently-elevated position to permit the convenient carrying out of the operation of molding a block or post within the machine.

The mold proper, which is arranged upon the fixed base 1, essentially comprises the opposite longitudinal side walls 3 of a length slightly exceeding the full length of the article to be molded, a fixed transverse end wall 4, located at or near one end of the fixed base, movable end-wall sections 5, carried at one end of the longitudinal walls 3, and a removable bottom member 6, designed to be arranged flat upon the upper side of the base 1 and constituting the removable bottom for the mold, upon which bottom the article is molded and removed. The fixed end wall 4 is preferably secured fast to the upper side of the fixed base 1 contiguous to one end thereof and is provided therein with a pair of spaced keeper-mortises 7, which are designed to removably receive therein the tenons 8, formed at one end of the longitudinal side walls 3, which side walls are provided at their opposite extremities with the inturned or inwardly-projecting end-wall sections or halves 5, which when brought together constitute the complete end wall of the mold directly opposite the fixed end wall 4. The said end-wall sections or halves 5, carried, respectively, by the opposite side walls 3 at one end of the latter, are provided at their lower edges with the clearance-notches 9, which fit over and register with one end of the movable bottom member 6 of the mold when the latter is completely closed, as may be plainly seen from Figs. 1, 2, and 5 of the drawings, thereby closing all spaces throughout the interior space of the mold, so as to provide for forming a perfectly-shaped article therein.

A distinctive feature of the present invention resides in maintaining the longitudinal side walls 3 in an upright position upon the fixed horizontal base 1, while at the same time associating therewith means for positively and definitely imparting thereto an endwise movement whereby said side walls will slide longitudinally upon the base and at the same time will be permitted to approach toward and recede from each other in the operation of closing and opening the mold to facilitate the molding operation. These several movements are provided for in the side walls 3 by associating therewith suitable guiding devices comprising means not only for guiding the side walls in fixed longitudinal planes for a portion of their movement, but also for camming said walls inward and outward in the operation of closing and opening the mold. Any suitable guiding devices may be resorted to for this purpose; but a convenient and practical construction is shown in the drawings and resides in providing each of the walls 3 at opposite sides of the transverse center thereof with guide pins or projections 10, slidably engaging in the guiding and camming slots 11, formed in the fixed base-piece 1. Each of the guiding and camming slots 11 is provided with a straight portion 12, disposed approximately parallel to the longitudinal center or the base-piece, and with an outwardly-deflected camming portion 13, forming a continuation of the straight portion of the slot, but curved or inclined toward the adjacent outer edge of the base-piece to effect a camming in and out of the said wall in a manner to be presently explained. A pair of the said slots 11 is associated with each endwise-movable side wall 3, and the curved portions 13 of the slots at opposite sides of the longitudinal center of the base-piece are reversely or divergently related to provide for simultaneously and synchronously moving the side walls inward and outward when actuated by the operating device.

Any suitable operating device may be employed for imparting longitudinal or endwise movement to the side walls 3. A practical form of the device is shown in the drawings and consists in the employment of a swinging operating-lever 14, operating above the base-piece and mold and provided with a rock-shaft member 15, arranged transversely beneath the base-piece and journaled in suitable bearings 16, fitted to the base-piece at the under side thereof. This rock-shaft member 15, which is thus journaled transversely beneath the fixed base or base-piece, is provided intermediate its ends with a centrally-arranged crank 17, to which is loosely pivoted or connected, as at 18, one end of a pair of adjusting-links 19, the other ends of which links are respectively connected, as at 20, to the opposite side walls 3. This point of connection 20 is preferably made between one end of the links 19 and the guide pins or projections 10 of the side walls at or contiguous to one end of said side walls, as may be plainly seen from Fig. 4 of the drawings.

The swinging operating-lever 14 is provided at its free end with a handle 23, deflected at right angles to the body of the lever and in the form of an approximate U-shaped yoke, which is designed to engage over the end of the mold opposite the fixed end wall 4, and thus brace and hold together one end of the side walls and the end-wall sections or halves 5 carried thereby. This lever construction provides a mold-clamp as well as an operating means for adjusting or moving the troweling side walls 3.

The fixed base or base-piece 1 is further provided therein within the vertical plane of the mold proper with a plurality of waste openings or slots 21, which permit sand or gravel to freely pass through, and thus prevent accumulation of foreign substances beneath the removable bottom mold member 6. In this connection it will also be observed that the base or base-piece 1 is preferably provided within the vertical plane of the mold proper with a series of supporting-rollers 22, journaled transversely in bearings provided at the upper side of the base-piece and spaced a suitable distance apart to provide a roller-support for the said removable bottom member 6, thus greatly facilitating the handling of such member in positioning the same and particularly in withdrawing it with the molded article thereon.

From the foregoing it will be understood that with the molded parts in their assembled relation (shown in Fig. 1) and the mold locked or held together by the combination handle and clamp 23 the cement or other plastic material may be packed into the molding-space to form the block, post, or other article to be molded. When the mold is ready to be opened up, it is simply necessary to grasp the handle 23 and swing the lever 14 upwardly. This motion rocks the shaft member 15, which exerts a pulling action upon the adjusting-links 19, with the consequence of moving the side walls 3 endwise out of engagement with the keeper-mortises 17. For the distance of the length of the straight portions 12 of the slots 11 the said side walls necessarily exert a troweling or smoothing action upon the sides of the molded article. When the guide-pins 10 reach the outwardly-deflected portions 13 of the guiding-slots, the said side walls will be cammed outwardly away from the article without breaking or otherwise injuring the finish of the sides thereof. A continued movement of the lever 14 spreads the side walls 3 sufficiently away from the molded article to permit one end of the removable bottom member 6 to be grasped and drawn outward upon its roller-support with the molded article thereon, thereby providing a most convenient and desirable method of removing the article from the molding-machine. When the removable bottom member 6 is replaced upon its roller-support, it is only necessary to lower the operating-lever 14 to provide for closing the mold members into their coöperating relation to form the mold proper.

In adapting the molding-machine for constructing cement fence-posts it is desirable to have the side walls and bottom member 6 of the mold proper of tapered form to correspond to the taper of the post, as may be plainly seen from the drawings.

In connection with the troweling action involved in this machine it will of course be understood that this is accomplished by reason of providing for a relative endwise movement of the molded article and the opposite side walls of the mold, which action can obviously be accomplished in various ways without departing from the invention.

From the foregoing it is thought that the construction, operation, and many advantages of the herein-described molding-machine will be readily apparent without further description, and it will be understood that various changes in the form, proportion, and minor details of construction may be resorted to without departing from the spirit of the invention or sacrificing any of the advantages thereof.

Having thus described my invention, what I claim, and desire to secure by Letters Patent, is—

1. In a molding-machine of the class described, the mold proper having endwise-movable side walls, and an operating device comprising means for reciprocating both of said walls to effect a troweling action on the molded article, said device also having means for moving said side walls off and away from the sides of the article.

2. In a molding-machine of the class described, the mold proper having endwise-movable and laterally-shiftable walls.

3. In a molding-machine of the class described, the mold proper having endwise-movable and laterally-shiftable side walls, said walls being movable in a straight line during a portion of their movement to effect a troweling action on the molded article.

4. In a molding-machine of the class described, the mold proper having endwise-movable and laterally-shiftable side walls, and means for synchronously operating said walls to carry the same along the sides of the molded article in a troweling action for a portion of their movement prior to their separation from the article.

5. In a molding-machine of the class described, a base, a fixed end wall arranged on the base, and endwise-movable side walls arranged for movement on the base into and out of engagement with the fixed end wall and carrying at one end end-wall sections or halves.

6. In a molding-machine of the class described, a base, a fixed end wall on the base, a removable bottom mold member arranged on the base, and endwise-movable side walls arranged for movement on the base into and out of engagement with the fixed end walls and carrying at one end end-wall sections or halves engaging over the bottom mold member.

7. In a molding-machine of the class described, a base, a fixed upright end wall having keeper-mortises, endwise-movable side walls having at one end tenons working into and out of said mortises and provided at their opposite ends with inturned end-wall sections or halves, and a removable bottom mold member arranged upon the base between the said side walls.

8. In a molding-machine of the class described, the mold proper having endwise-movable side walls, and an operating device for said side walls having a member constituting a mold-clamp engaging with the said side walls.

9. In a molding-machine of the class described, the mold proper having endwise-movable side walls, guiding devices for said side walls comprising means for guiding the same in a longitudinal direction and also for camming said walls outward and inward, and an operating device having means for synchronously moving said walls.

10. In a molding-machine of the class described, the base having separate pairs of guiding-slots having straight and outwardly-deflected portions, the mold proper having endwise-movable side walls carrying guide-pins working in said slots, and an operating device comprising a swinging lever having a cranked rock-shaft member journaled on the base, and link connections between the crank of said shaft and the opposite side walls.

11. In a molding-machine of the class described, the base, the mold proper having endwise-movable and laterally-shiftable side walls, an operating device having adjusting connections with said side walls and provided with a lever member having a yoke-shaped handle constituting a mold-clamp engaging the opposite side walls at one end of the mold when the latter is closed.

12. In a molding-machine of the class described, the base having a series of supporting-rollers thereon, and the mold proper having endwise-movable and laterally-shiftable side walls, and a removable bottom member arranged for support upon said rollers.

13. In a molding-machine of the class described, the base having a series of supporting-rollers thereon, and the mold proper including a removable bottom member arranged for support upon said rollers.

In testimony whereof I affix my signature in presence of two witnesses.

JAMES J. COX.

Witnesses:
B. A. GARLINGHOUSE,
L. T. COX.